April 19, 1927.
C. E. BENEDICT
CREAM SEPARATOR
Filed April 9, 1926
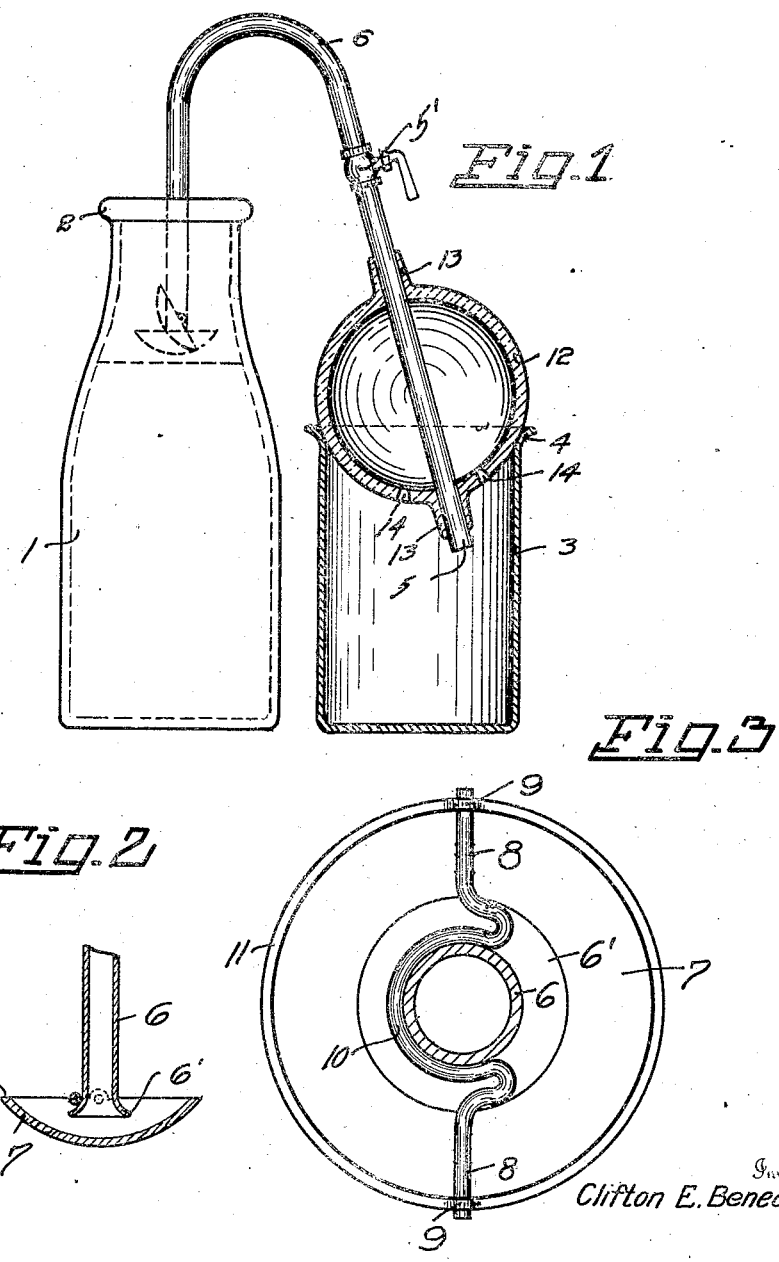
Inventor
Clifton E. Benedict
By Herbert E. Smith
Attorney Patented Apr. 19, 1927.

1,625,385

UNITED STATES PATENT OFFICE.

CLIFTON E. BENEDICT, OF SPOKANE, WASHINGTON.

CREAM SEPARATOR.

Application filed April 9, 1926. Serial No. 100,902.

My present invention relates to improvements in cream separators of the siphon type, and especially designed for use in connection with the standard type of milk bottles, whereby the purchaser of the bottle of milk may separate the cream therefrom by drawing the latter from the milk and depositing the cream in a suitable receptacle provided therefor. As is well known in domestic circles it is desirable for many reasons and purposes to separate and draw off the accumulated cream from the top of the milk bottle as the latter is delivered by the milkman. Numerous devices have been designed for this purpose, but those with which I am acquainted have proven unsatisfactory, as it has been found practically impossible to pour off or draw off the cream without at the same time mixing milk with the cream as the separation takes place. By the utilization of the device of my invention in connection with the bottle of milk, the cream may be drawn off from the top of the bottle of milk without disturbing the milk contained therein, and the cream deposited in a receptacle for future use.

The invention consists, in certain novel combinations and arrangements of parts involving the use of a siphon as will hereinafter be more fully set forth and claimed.

In the accompanying drawings I have illustrated one complete example of the physical embodiment of my invention wherein the parts are combined and arranged in accord with the best mode I have thus far devised for the practical application of the principles of my invention.

Figure 1 is a view showing in side elevation a bottle of milk with which my invention is used, the draft tube being shown in operative position, with the bulb of the siphon device and the cream receptacle or glass-cup in section.

Figure 2 is an enlarged detail section of the suction head connected with the draft tube.

Figure 3 is an enlarged, interior plan view of the suction head with the draft tube in cross section.

In order that the general relation and assembly of parts may readily be understood I have shown in Figure 1 a standard type of milk bottle as 1 with the usual top annular rib 2, and the line of separation between the accumulated cream and milk in the bottle is indicated in dotted lines.

The cream from above the dotted line in Figure 1 is to be drawn by suction and deposited in the receptacle or glass cup 3, which is fashioned with an annular, flaring mouth 4. The cream or other liquid is drawn from the milk bottle through the draft tube 5 which may be fashioned of suitable material, provided with a "goose-neck" bend or return bend 6, and a shut off valve 5' which controls the flow of the liquid. The inlet or suction end of the tube is formed with an outwardly flaring mouth 6' as best seen in Figure 2.

A pivoted suction head 7 is carried at the suction or inlet end of the tube, said head being of suitable material and of concavo-convex shape. A pair of trunnions 8 extend radially from the suction end of the tube, and the suction-head 7 is provided with diametrically arranged perforated ears 9 by means of which the suction head is pivoted on the trunnions. The trunnions are preferably of wire and are formed with an intermediate attaching loop 10 which passes around and encircles the major portion of the circumference of the lower end of the draft tube 6. In this manner the suction head is pivoted to or pivotally suspended at the lower end of the suction tube in order that the head may be turned to the (dotted position) angular position in Figure 1 and inserted in the cream without causing undue disturbance of the cream. The pivoted suction head is of course of such diameter as to permit its entrance into and exit from the mouth of the milk bottle.

The suction head is inserted down through the cream until the under or convex surface of the head reaches the line of separation between the milk and cream, and the cream enters this suction head over the edge 11 which pass over the wall of the head and at the exterior of the head open just above the line of separation.

In connection with the siphon or draft tube I utilize a collapsible bulb 12 of the usual rubber type which has attaching heads 13 for securing it at the lower or outlet end of the tube 5, and an annular series of air holes 14 are provided in the bulb.

In use the suction head is inserted in the upper end of the milk bottle and the bulb is placed in the upper open end of the receptacle 3, it being understood of course that the receptacle is at a lower level than the lower level of the cream line in the milk bottle. The bulb is seated in the outwardly flaring top edge of the receptacle 3 and is adapted to form a substantially air tight joint therewith when the bulb is expanded, as indicated.

While located in its seat the bulb is compressed to force air from the interior thereof, through the receptacle, and thence out at the top edge of the receptacle. Compression is then released from the bulb, the latter is seated in the top flaring mouth of the receptacle to prevent ingress of air from the atmosphere, and the expanding bulb causes air to flow from the receptacle 3 into the bulb through holes 14, creating a partial vacuum in the receptacle. The cream is then forced by atmospheric pressure from the bottle into the receptacle in well known manner.

After the cream has been separated and deposited in the receptacle, the parts forming the siphon may be removed and washed for subsequent use.

Having thus fully described my invention, what I claim as new and desire to secure by Letters Patent is—

In a cream separator the combination with a siphon tube having a flaring inlet-end and a pair of trunnions having an intermediate attaching loop secured to said end, of a concavo-convex suction head below said inlet end and pivotally supported on said trunnions.

In testimony whereof I affix my signature.

CLIFTON E. BENEDICT.